Nov. 18, 1941.  D. E. GRAY ET AL  2,263,126
GLASS WORKING APPARATUS AND METHOD
Filed Aug. 12, 1938  13 Sheets-Sheet 1

INVENTORS.
DAVID E. GRAY
LEANDER N. POND
AND WALTER C. WEBER
BY
*Dorsey, Cole + Garner*
ATTORNEYS.

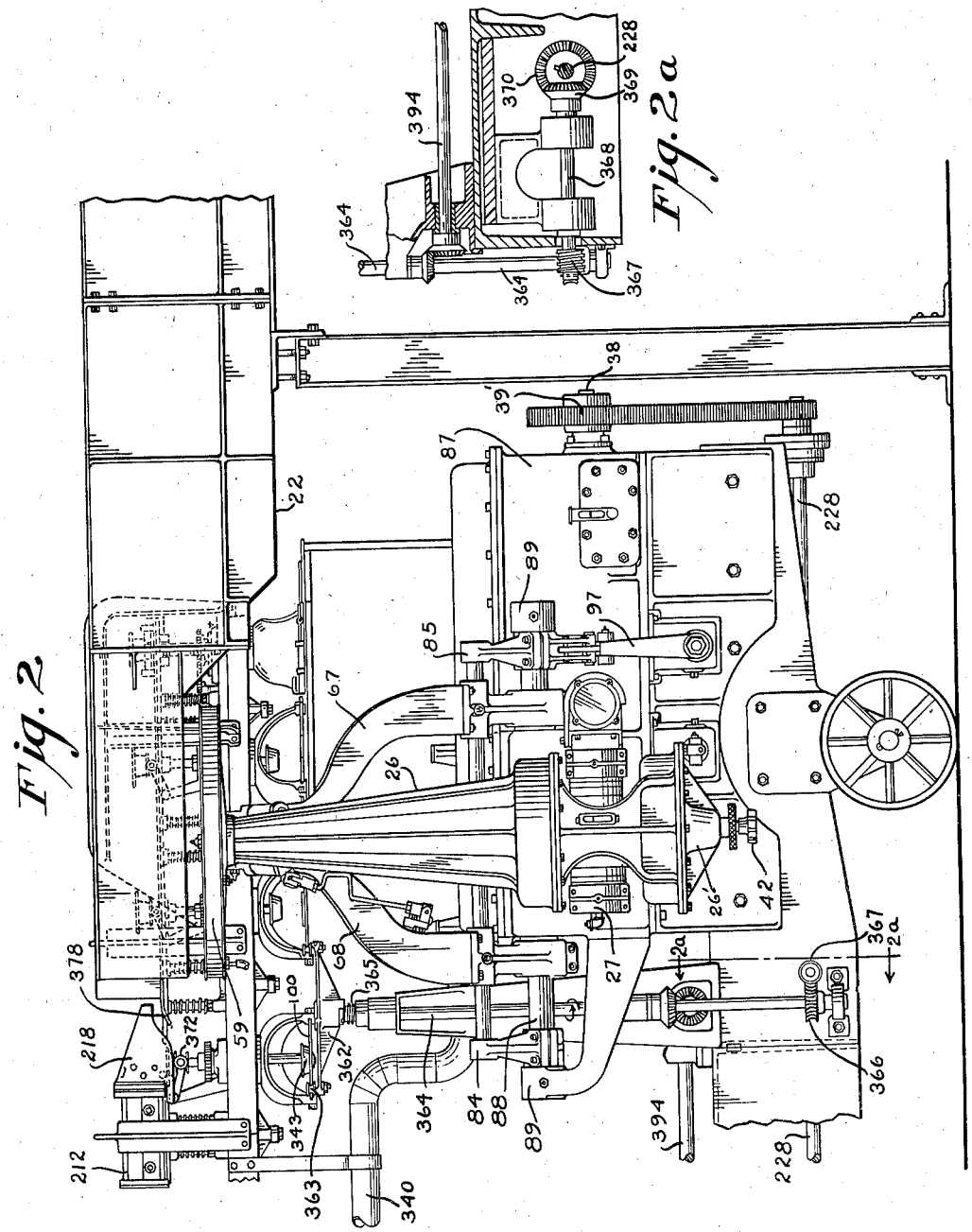

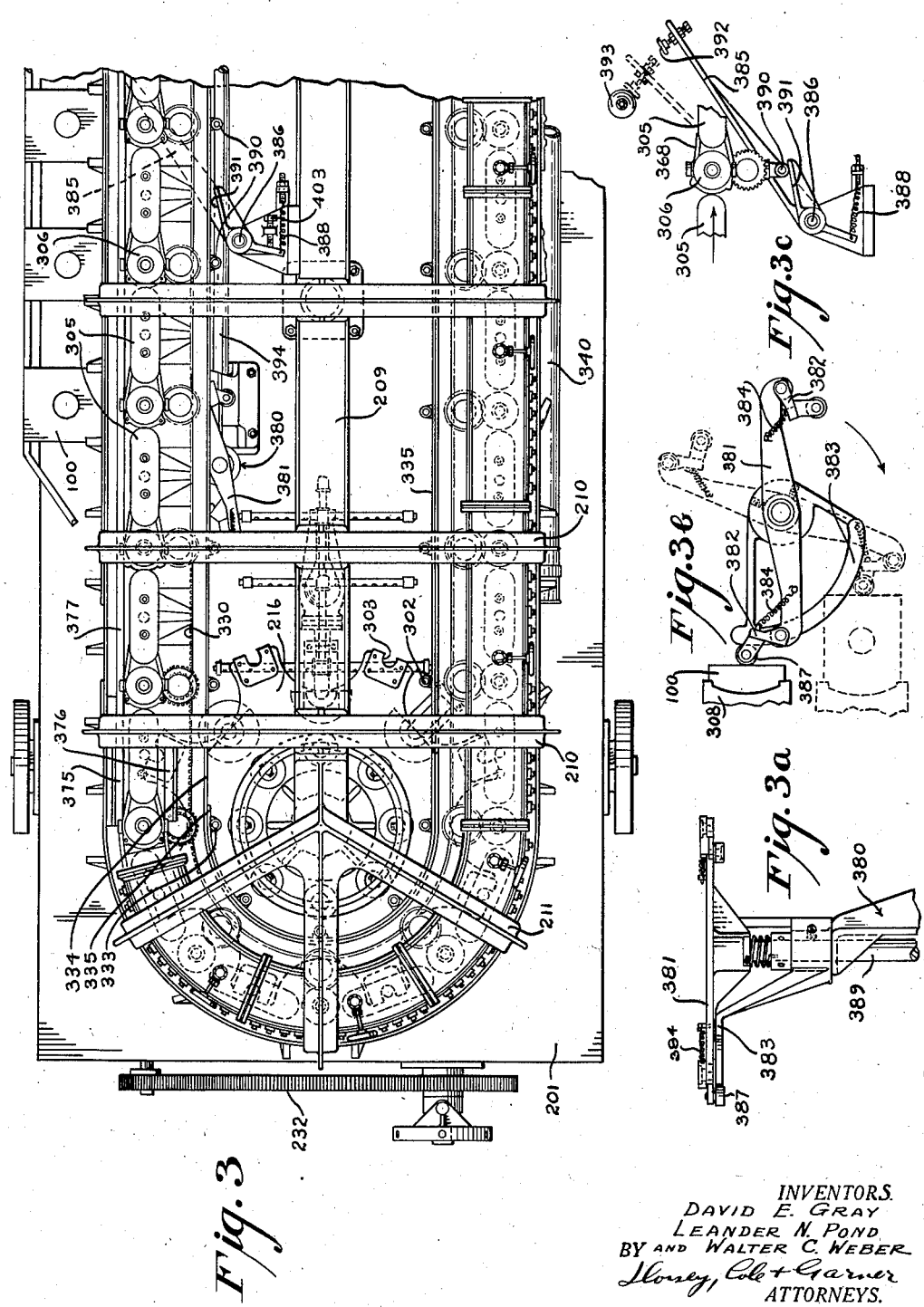

Nov. 18, 1941.    D. E. GRAY ET AL    2,263,126
GLASS WORKING APPARATUS AND METHOD
Filed Aug. 12, 1938    13 Sheets-Sheet 4
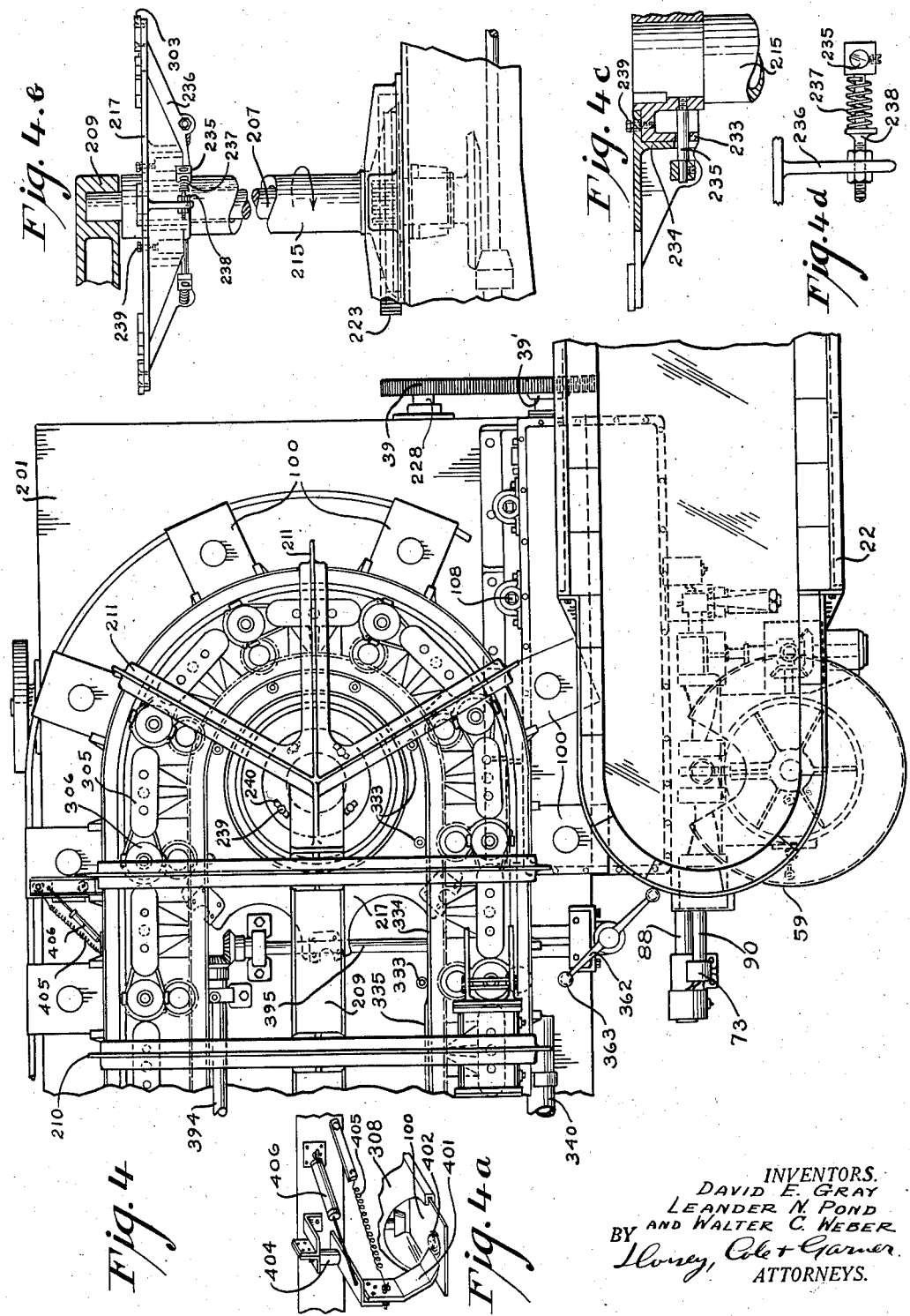
INVENTORS.
DAVID E. GRAY
LEANDER N. POND
AND WALTER C. WEBER
BY
ATTORNEYS.

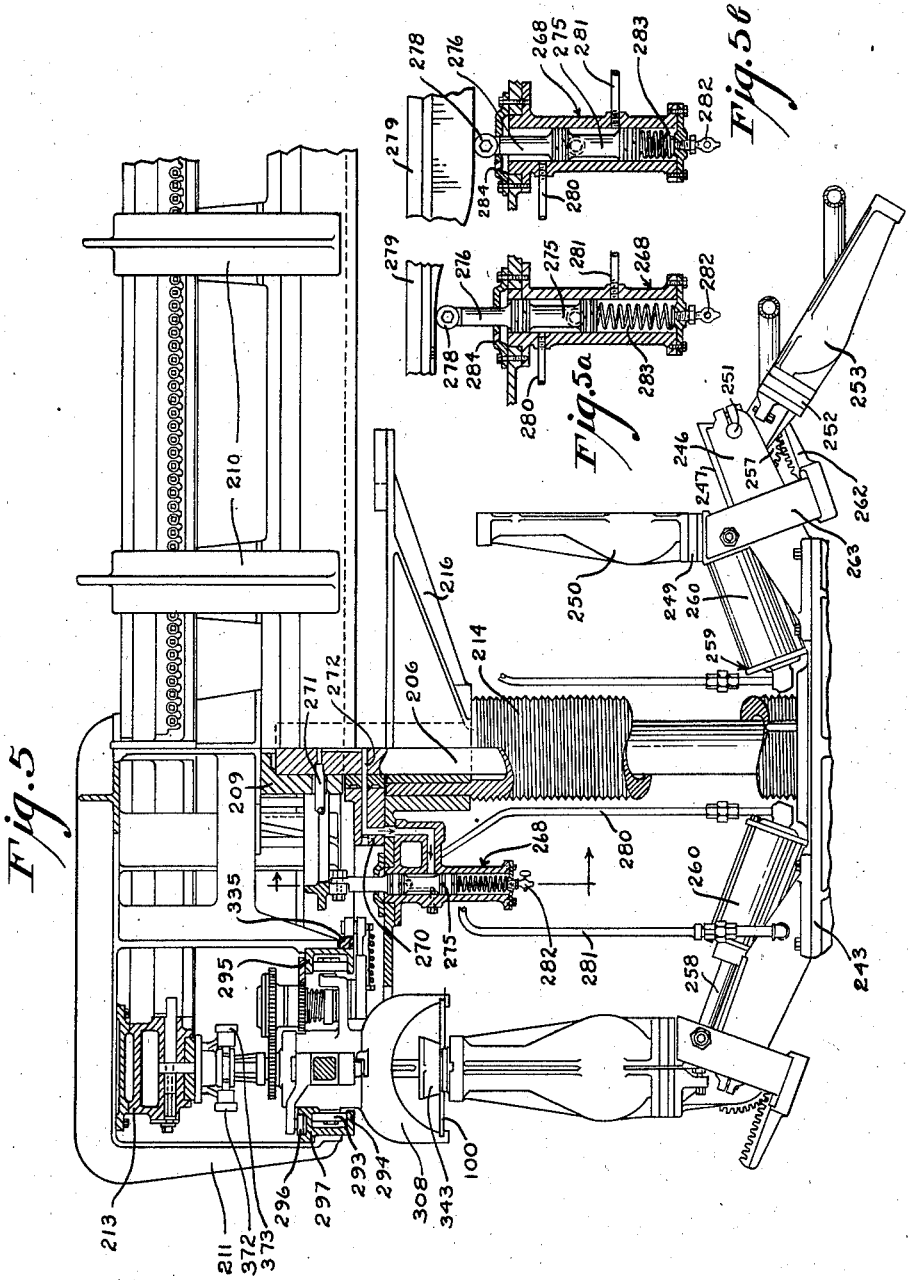

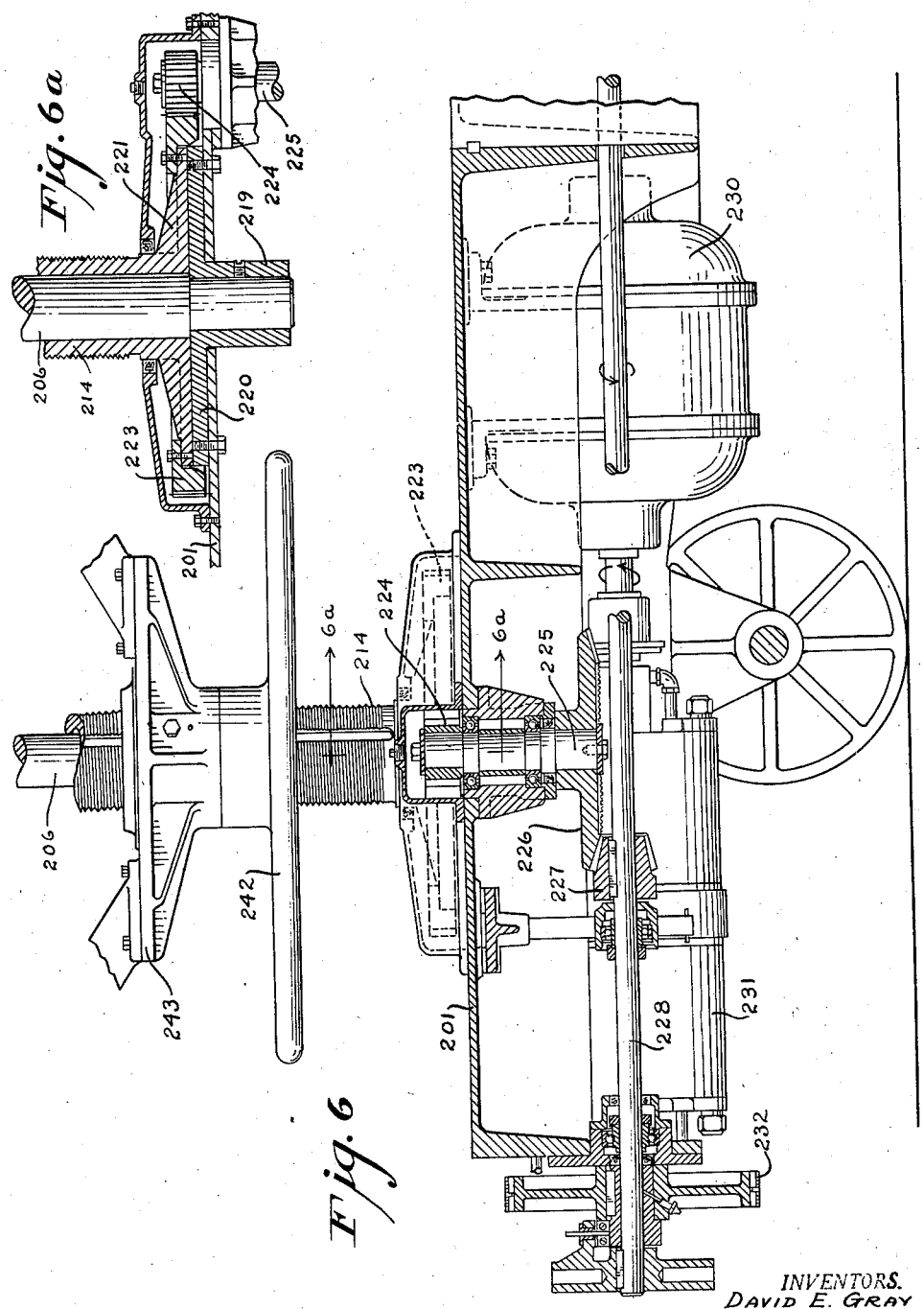

Nov. 18, 1941.  D. E. GRAY ET AL  2,263,126
GLASS WORKING APPARATUS AND METHOD
Filed Aug. 12, 1938  13 Sheets-Sheet 7
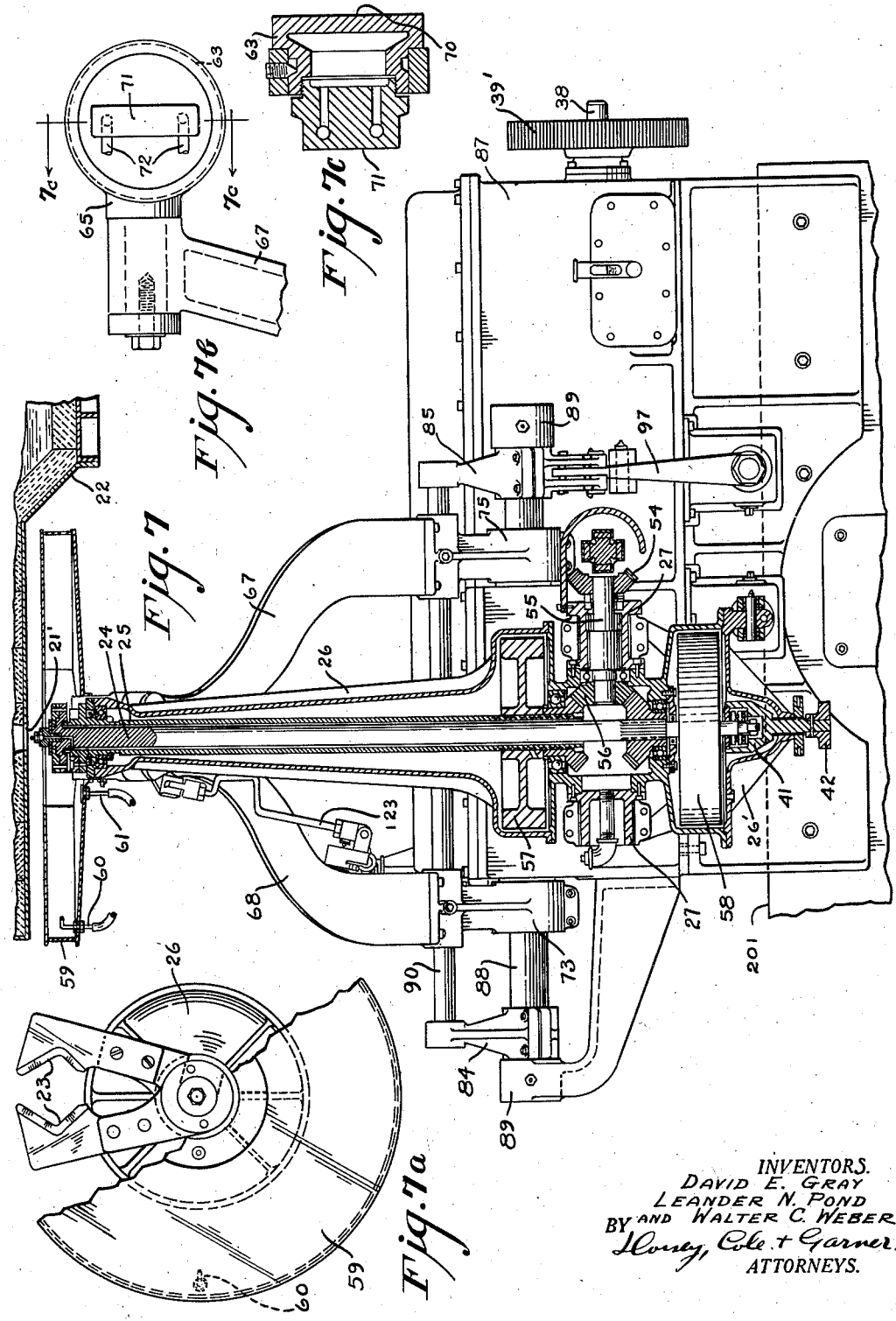
INVENTORS.
DAVID E. GRAY
LEANDER N. POND
AND WALTER C. WEBER
BY
ATTORNEYS.

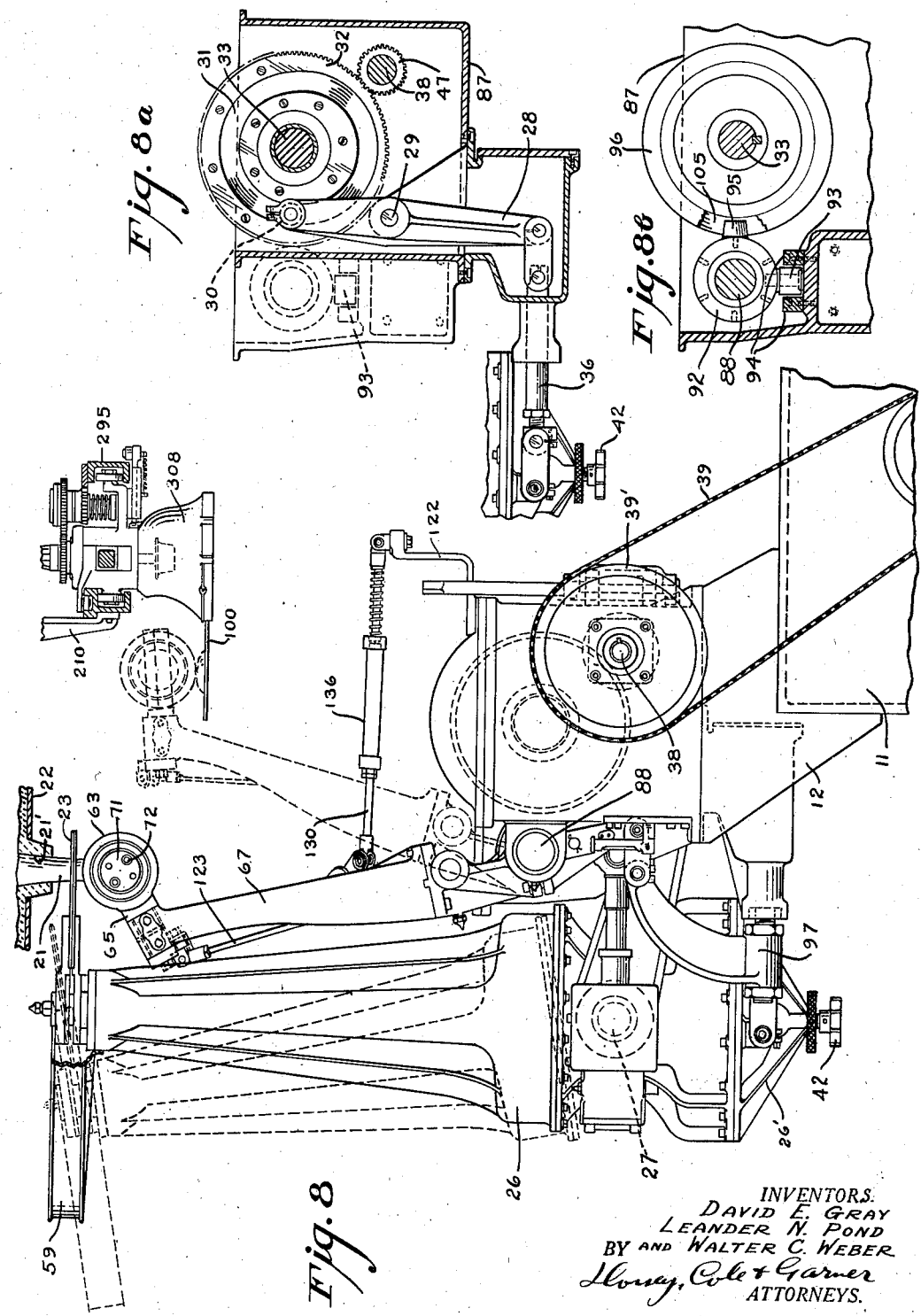

Nov. 18, 1941.　　　D. E. GRAY ET AL　　　2,263,126
GLASS WORKING APPARATUS AND METHOD
Filed Aug. 12, 1938　　　13 Sheets-Sheet 9
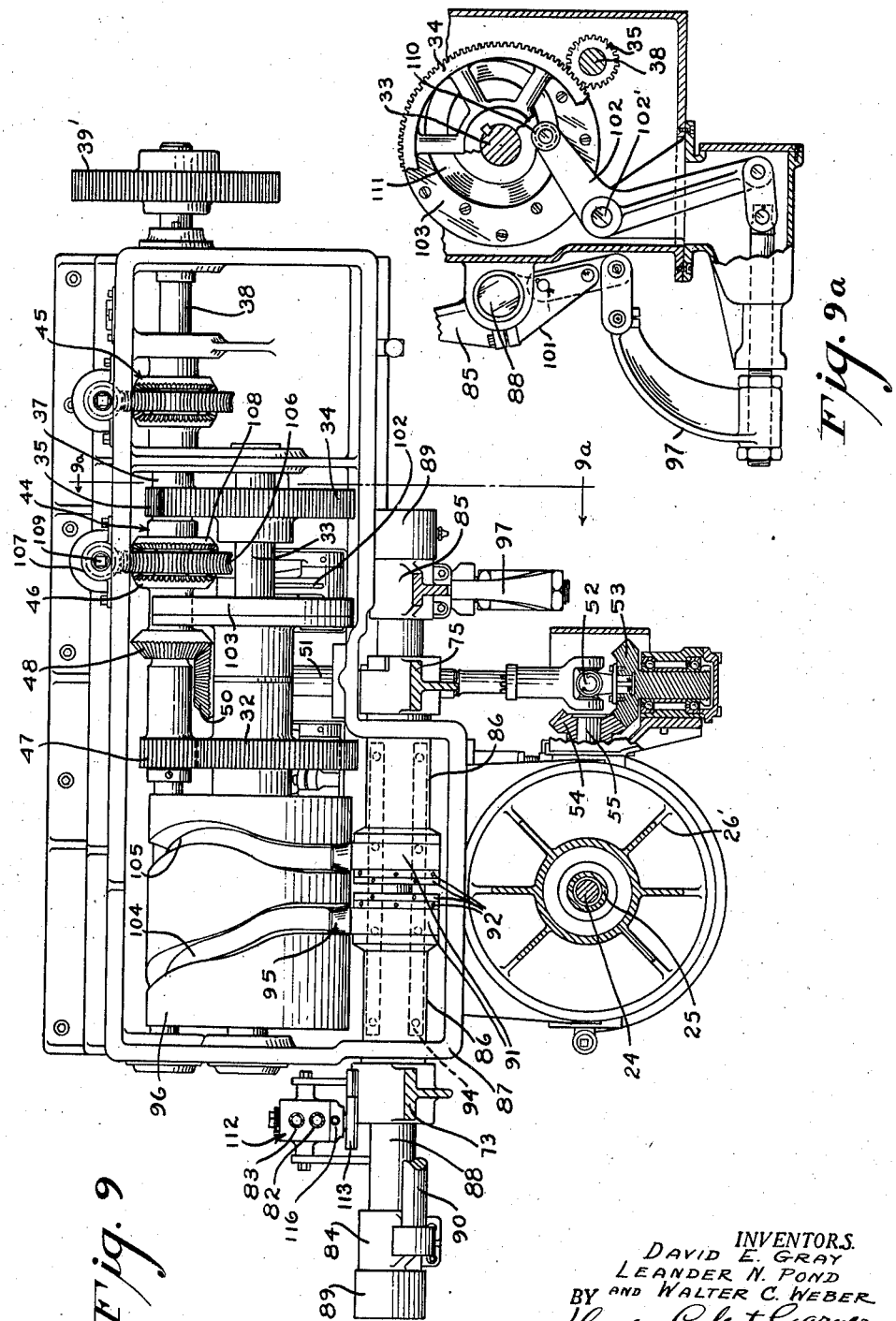
INVENTORS.
DAVID E. GRAY
LEANDER N. POND
BY AND WALTER C. WEBER
ATTORNEYS.

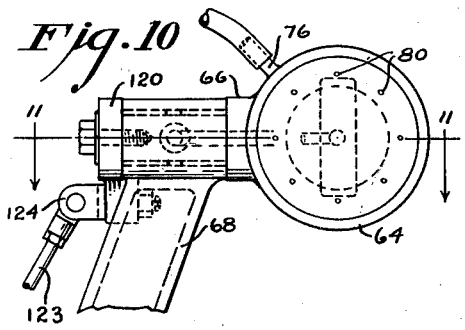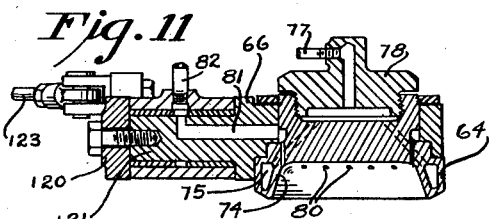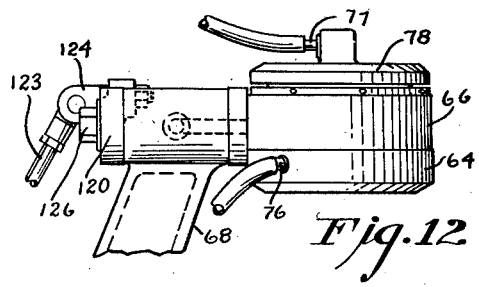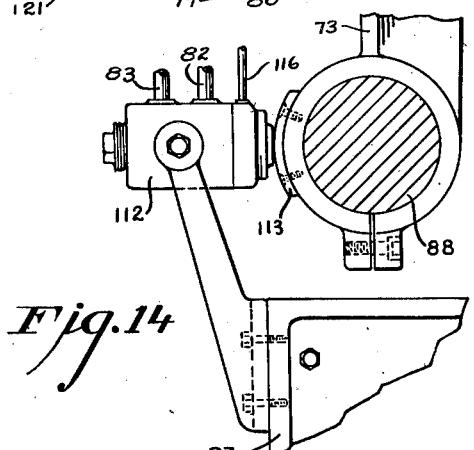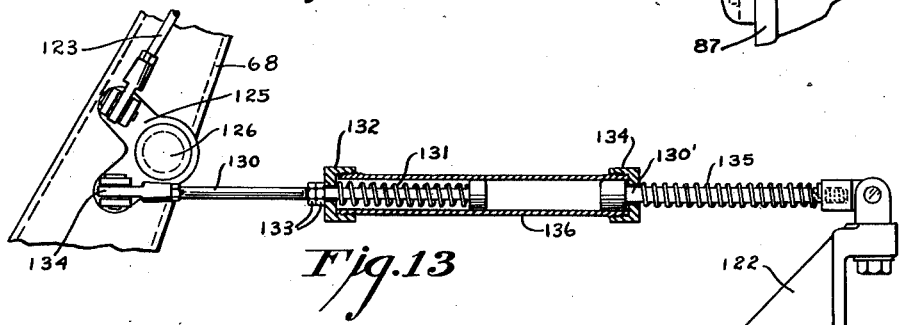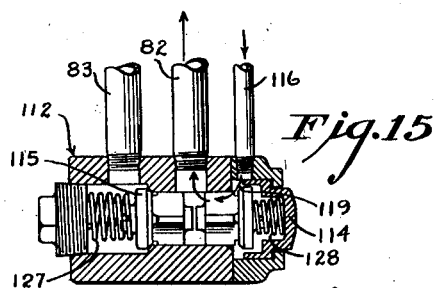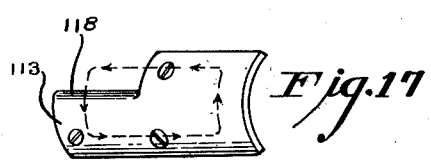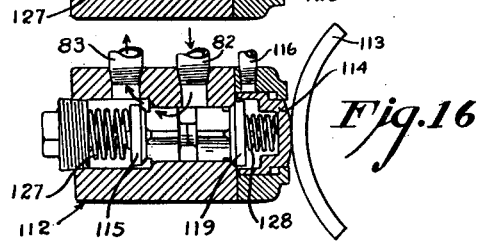

Nov. 18, 1941.  D. E. GRAY ET AL  2,263,126
GLASS WORKING APPARATUS AND METHOD
Filed Aug. 12, 1938  13 Sheets-Sheet 11
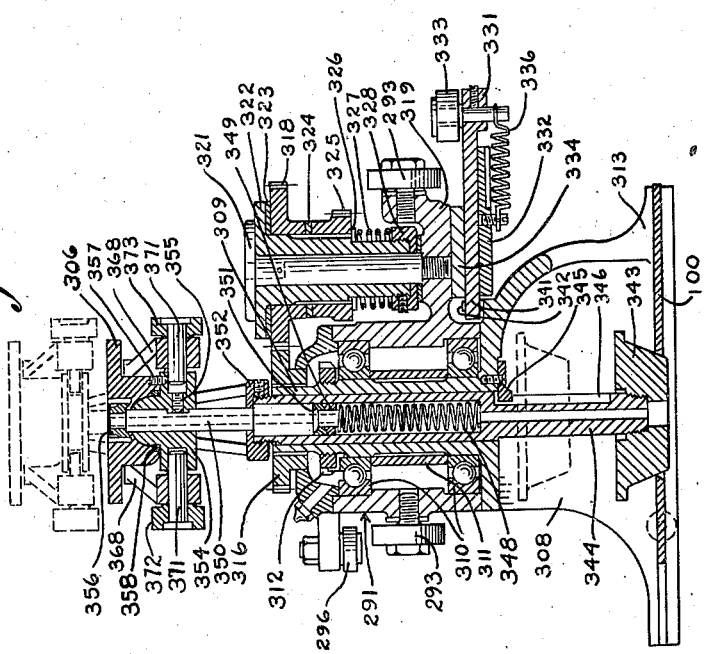
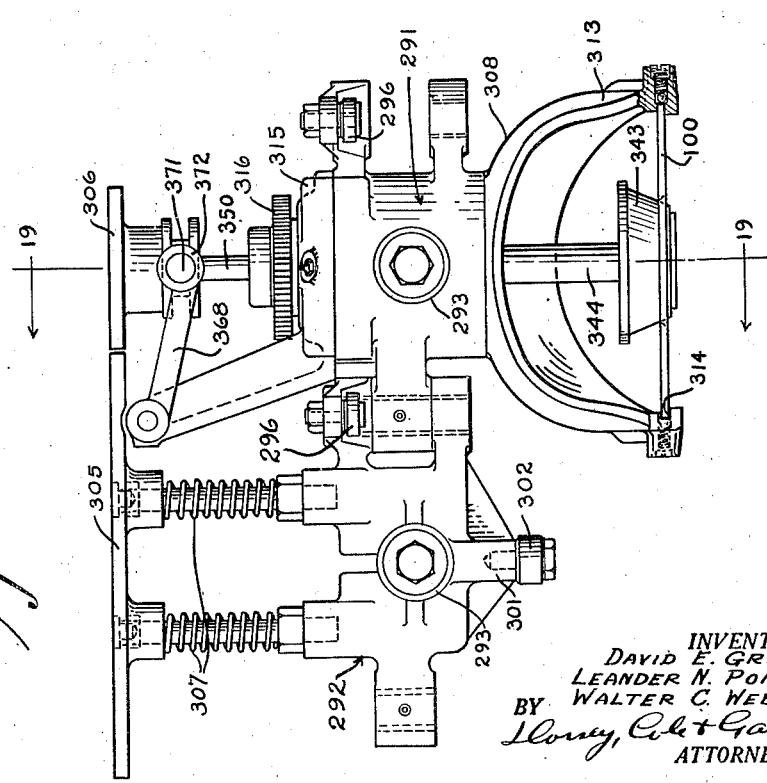
INVENTORS.
DAVID E. GRAY
LEANDER N. POND AND
BY WALTER C. WEBER
ATTORNEYS.

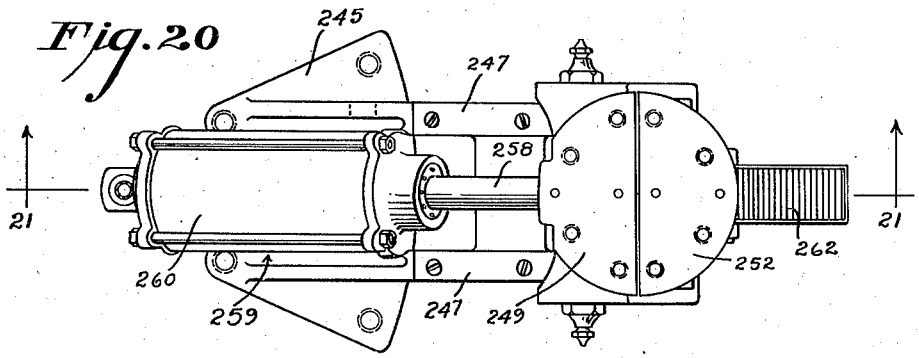
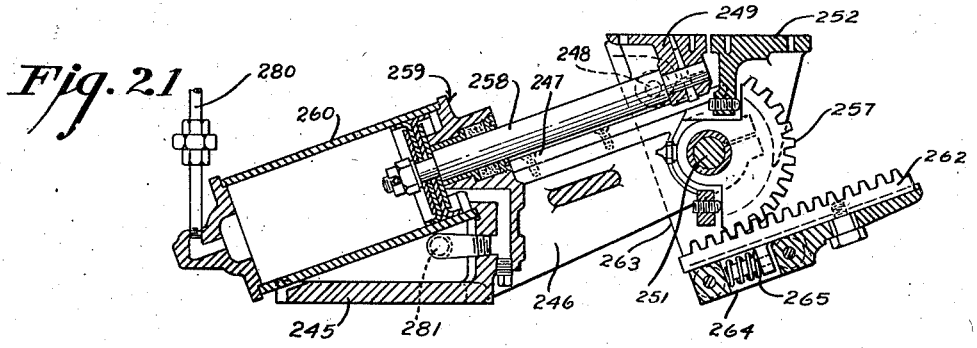
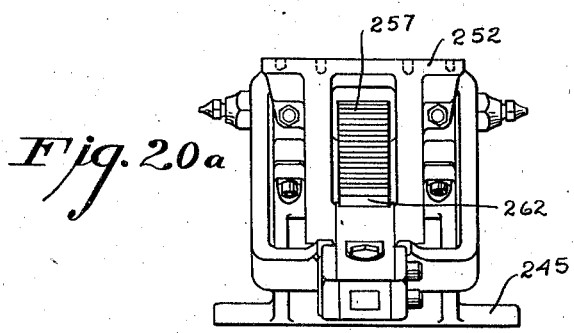

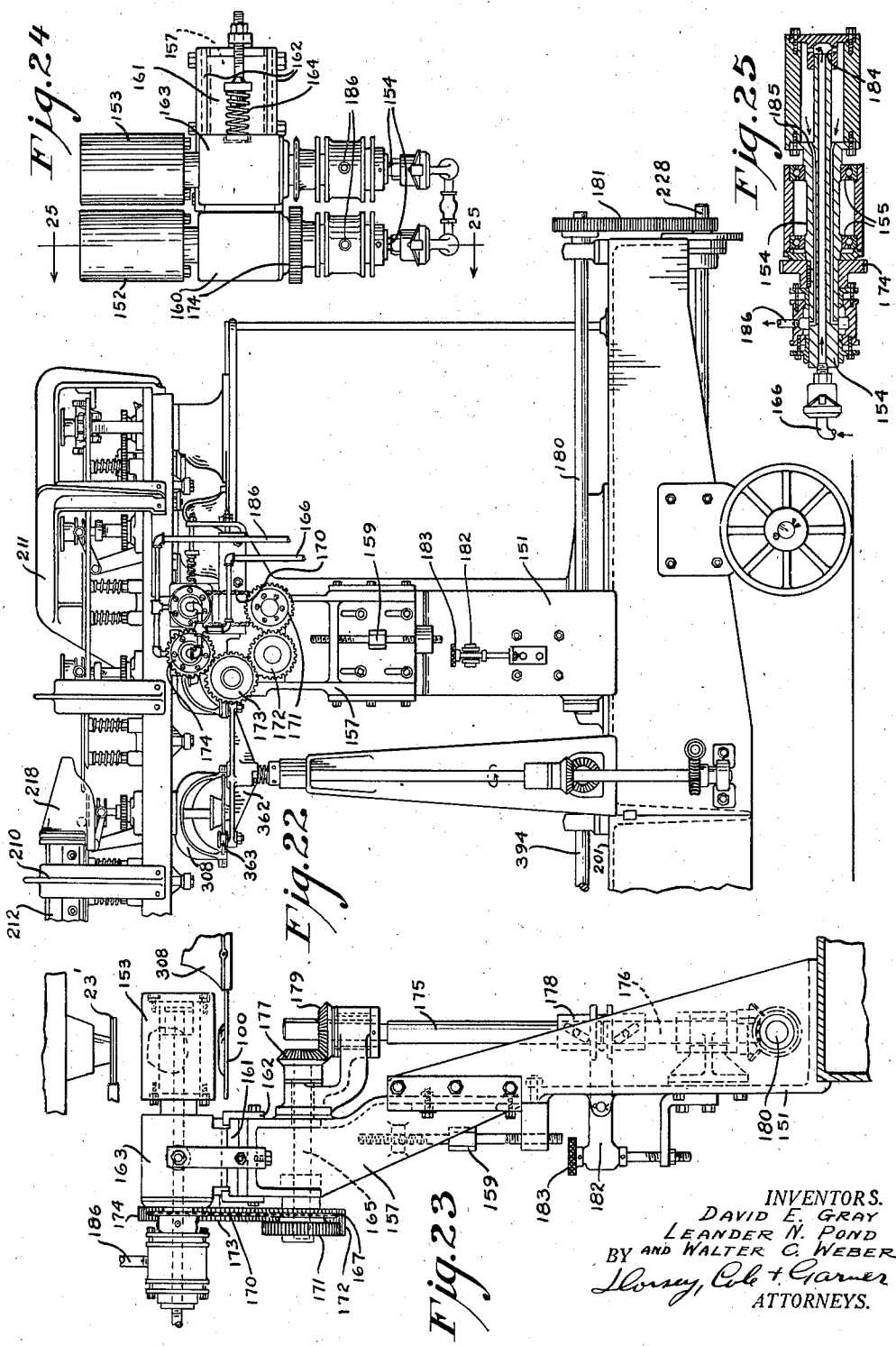

Patented Nov. 18, 1941

2,263,126

UNITED STATES PATENT OFFICE 2,263,126

GLASS WORKING APPARATUS AND METHOD

David E. Gray and Leander N. Pond, Corning, and Walter C. Weber, Painted Post, N. Y., assignors to Corning Glass Works, Corning, N. Y., a corporation of New York Application August 12, 1938, Serial No. 224,628

31 Claims. (Cl. 49—5)

The present invention relates to glass working apparatus and particularly to apparatus suitable for use in the quantity production of bottles, light bulbs, tumblers, lamp chimneys and similar hollow glass articles. The majority of glass working machines for making this type of ware have in the past been of the turret type, which receive successive charges of molten glass and form them into ware. A less common form of machine is of the chain type in which the glass articles are formed from a continuous plastic ribbon of glass carried by a chain of orifice plates. The present invention covers a form of apparatus embodying features of both foregoing types of machines, and also novel methods of feeding charges of glass thereto.

One object of the present invention is a glass working machine in which rotation of ware is effected during fabrication thereof.

Another object is a machine having a high mold efficiency whereby it is possible to produce a larger number of articles per mold per minute than is possible in a conventional chain type machine.

Further objects are improved methods of and apparatus for severing, preforming and delivering glass parisons to a working surface.

A still further object is the effective temperature control of parisons as they are being formed.

The invention embodies among its features a turret-chain machine, i. e., a machine which is provided with a chain of orifice plates for receipt of the glass to be formed into articles and with a turret carrying the molds employed in imparting a desired external shape to such articles.

The invention also embodies glass severing and charge delivering mechanisms involving the use of high speed shears which separate a stream of glass into successive gobs and cup mechanisms which seize the gobs immediately after their separation from the parent body, communicate a desired shape to them and deliver the parisons so formed onto orifice plates of the chain as they arrive at a loading position. This apparatus is hereinafter referred to as a gob forming transfer or feeder assembly.

In the drawings

Fig. 1 and Fig. 2 together constitute a side elevational view of a complete machine embodying the present invention, with an extended forehearth of a melting tank for feeding glass to the machine shown in the right hand position of Fig. 2.

Fig. 2a is an enlarged fragmentary section taken on line 2a—2a of Fig. 2;

Figs. 3 and 4 together constitute a plan view of equipment illustrated in Figs. 1 and 2;

Fig. 3a is an enlarged side elevational view of the upper part of an orifice plate pusher assembly;

Fig. 3b is a plan view of the above pusher assembly illustrating its operative relation to the orifice plates;

Fig. 3c is a plan view of a crack-off arm assembly and illustrates orifice plate equipment in operative relation thereto;

Fig. 4a is an enlarged perspective view of an orifice plate scraper assembly;

Fig. 4b is a side elevation of the column and associated parts at the loading end of the machine;

Figs. 4c and 4d are enlarged fragmentary details of the upper end of the above column and associated parts;

Figure 1:
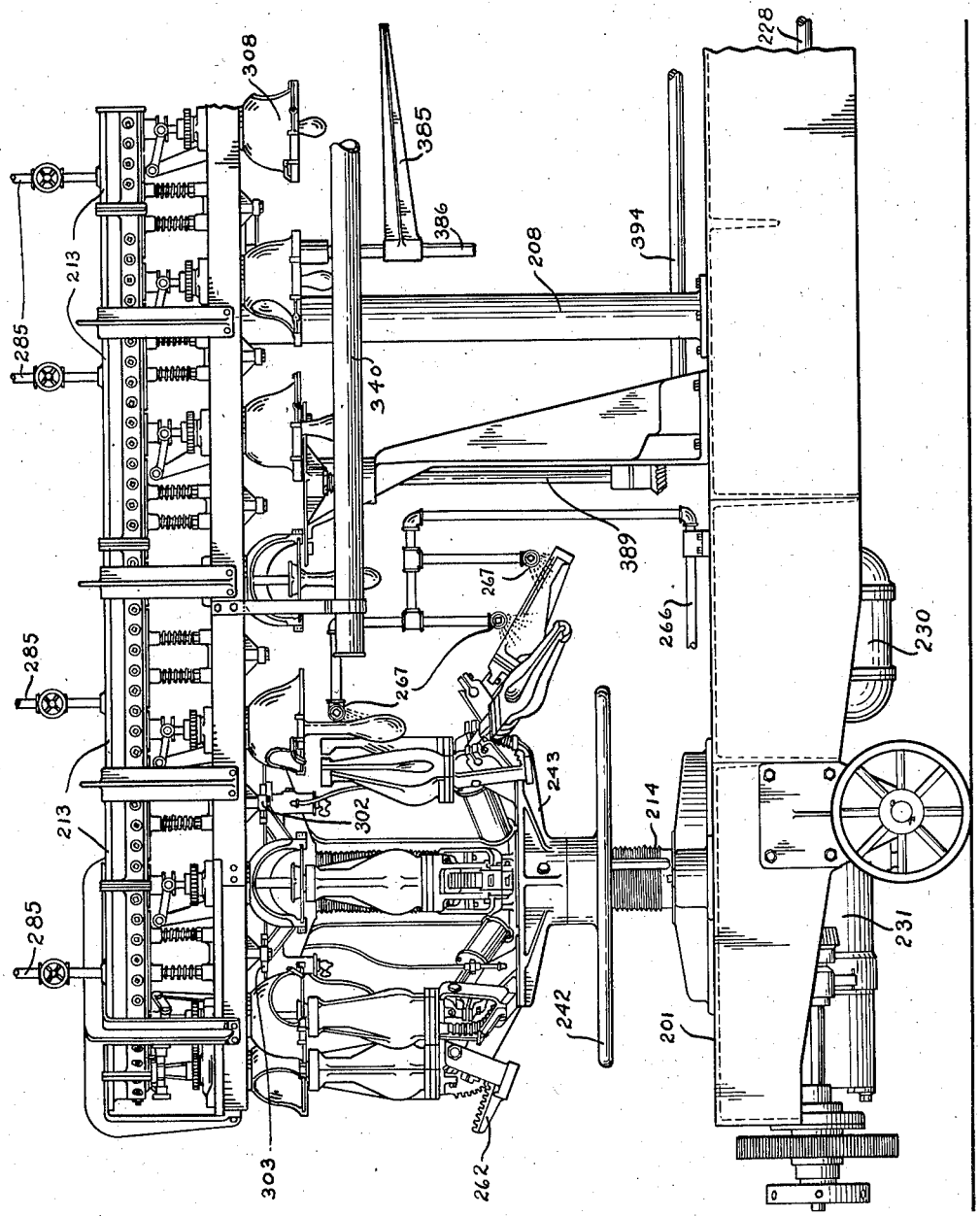

Figs. 5 and 6 together constitute an enlarged side elevational view, partly in section, of the equipment shown in the left portion of Figs. 1 and 3;

Fig. 5a is an enlarged sectional elevation of one of the valve assemblies and an associated section of cam track enabling the valve to assume the position in which it controls the closing of its associated mold assembly;

Fig. 5b is a view similar to Fig. 5a, but shows a section of cam track which has actuated the valve assembly as required to control the opening of its associated mold assembly;

Fig. 6a is a sectional elevational taken on line 6a—6a of Fig. 6;

Fig. 7 is an enlarged side elevational view, partly in section, of the glass severing, forming and delivering mechanism;

Fig. 7a is a plan view of the shear portion of the above mechanism;

Fig. 7b is an enlarged view of a part of the right hand cup arm showing the manner of assembly of a cup thereto;

Fig. 7c is a sectional view taken on line 7c—7c of Fig. 7b;

Fig. 8 is an end elevation of the apparatus in Fig. 7 illustrating its position relative to the forehearth and to the orifice plates;

Fig. 8a is a sectional view taken on lines 8a—8a of Fig. 9, showing the manner of oscillation of the shear assembly;

Fig. 8b is an elevational view, partly in section, illustrating details of the manner of producing lateral movement of the cup arms not apparent from Fig. 9;

Fig. 9 is a plan view of the gear box of the glass severing, forming and delivering mechanism with the cover removed and with certain parts exterior to the box shown in section;

Fig. 9a is a view taken on line 9a—9a of Fig. 9 illustrating the apparatus for effecting oscillating movement of the cup arms;

Fig. 10 is an enlarged view of a part of the left hand cup arm and cup assembly carried thereby and showing part of the cup turnover linkage;

Fig. 11 is a view on line 11—11 of Fig. 10;

Fig. 12 is a view similar to Fig. 10, but with the cup turned 90°, in position to deposit a charge of glass;

Fig. 13 is a view of the cup turnover linkage;

Fig. 14 is an enlarged end elevation, partly in section, illustrating details of the relationship of the air and vacuum control valve cam with respect to the left cup arm of the assembly not apparent from Fig. 9;

Fig. 15 is a sectional elevation of the above valve in the position in which it supplies compressed air to the cup;

Fig. 16 is a view similar to Fig. 15, but with the valve cam in operative relation therewith effecting the connection of a vacuum line to the cup;

Fig. 17 is a perspective view of the cam only, with arrows thereon indicating the approximate path of travel of the cam with respect to the operating button of the valve;

Fig. 18 is a side elevational view of the orifice plate driving link and orifice plate link assemblies respectively;

Fig. 19 is a view taken on line 19—19 of Fig. 18;

Fig. 20 is a plan view of a mold support and its pneumatic power operating unit;

Fig. 20a is an end elevation of Fig. 20;

Fig. 21 is a sectional view taken on line 21—21 of Fig. 20;

Fig. 22 is a side elevation corresponding to Fig. 2, illustrating the alternative form of gob forming transfer or feeder assembly associated therewith;

Fig. 23 is an enlarged end elevation of the above feeder assembly illustrating its position relative to a fore-hearth outlet and to the orifice plates;

Fig. 24 is a plan view of the above feeder assembly; and

Fig. 25 is a sectional view taken on line 25—25 of Fig. 24.

The embodiment of the present invention as illustrated by Figs. 1 to 21 inclusive, in general, comprises a gob feeder having shears which separate gobs of glass from the bottom end of a stream and a pair of cups which seize and shape the falling charges into parisons of a desired shape and then deposits them on the orifice plates of a moving chain in such a manner that the parts of the parison contacted by the shears are excluded from the articles later formed therefrom. On the continued advance of the loaded orifice plates blow-heads associated therewith function to blow the parisons into a form suitable for introduction into finishing molds. These molds are mounted on a turret and have a path of travel such that the partially formed articles suspended from the orifice plates enter the path of travel of the molds and are externally shaped thereby, then leave the path of travel of the molds and are subsequently separated from the cullet remaining and from the associated orifice plates. In an alternative embodiment of the invention, illustrated in Figs. 22-25 inclusive, the charges of glass after being separated from the stream are formed and deposited on the orifice plates by a pair of rolls of the same general character as those employed in a glass working machine covered by Woods et al., Patent No. 1,790,397, granted January 27, 1931.

*Gob forming transfer or feeder assembly*

In the present disclosure the gob forming transfer or feeder unit (Figs. 7, 8, and 9) is secured to the frame 11 of the blowing machine with which it is to be used by a suitable base 12 and the assembly suitably associated with a source of molten glass. In the present illustration glass 21 flows from an outlet 21' in the bottom of a forehearth 22 of a continuous melting furnace or refining tank (not shown). Shear blades 23 fixed to drive shafts 24 and 25 rotating at high speed are mounted in a housing 26 which is pivoted at 27 and is oscillated by a connecting rod 36 of a linkage (Fig. 8a) including a lever 28 pivoted at 29 and carrying a roller 30 riding in a cam groove 31 of a spur gear 32 carried by a sleeve bearing mounted for free rotation on a shaft 33. The power for driving and oscillating the shear blades 23 is taken off a shaft 38 through synchronizing differential assemblies 44 and differential 45 (Fig. 9). Power is transmitted to gear 32 for effecting the oscillating movement by a pinion 47 in mesh therewith. This pinion is one unit of a cluster gear assembly including spur and bevel pinions 46 and 48 respectively. The power for effecting rotation of the shears is through pinion 48 which is in mesh with a pinion 50 on one end of a shaft 51, the other end of which is splined into a universal joint 52 carrying a bevel pinion 53. This latter pinion is in mesh with a bevel pinion 54 (Figs. 7 and 9) carried on one end of a shaft 55 the other end of which carries a bevel pinion 56 in mesh with similar pinions fixed to the lower ends of shear drive shafts 24 and 25. The shaft 38 carries a chain gear 39' driven off the drive shaft 228 (Fig. 2) of the associated glass working machine through a drive chain 39. The speed of rotation of the shears with respect to their frequency of oscillatory movement is so calculated that they revolve several revolutions between each movement into range of the glass stream 21. By this arrangement the maximum advantage is taken of high blade velocity and of the inertia of fly wheels 57 and 58, mounted on the shear shafts, to maintain the speed of operation of the shears constant. The lower end of the shear shaft 24 is seated in an adjustment head threaded in the bottom plate 26' of housing 26 and carries a hand wheel 42 by means of which the head may be rotated to elevate or lower shaft 24 as required to obtain proper adjustment of the shear blades.

The shear blade housing 59 has a supply line 60 entering it by means of which low pressure water vapor or other liquid or gaseous cooling media is played on the shear blades. A second pipe 61 is also provided for drainage of condensed fluids accumulating in the shear housing.

Operating in synchronism with the shear blades are gob forming and transferring cups 63 and 64 (Figs. 7b, 7c, 10, 11 and 12) mounted in brackets 65 and 66 which are fixed or rotatably secured to supporting arms 67 and 68 as will be more fully brought out later.

The shaping or face surfaces of the cups, of course, depend somewhat on the type of ware being made. In the present example, wherein light bulbs are illustrated as the product of the machine, the so called cup 63 (Figs. 7b and 7c) is in the form of a shell, the front or shaping surface 70 of which is perfectly flat. A plug 71 carrying tubes 72 is threaded into the back side of the shell and enables the circulation of a cooling medium therethrough. The cup 64 (Figs. 10, 11 and 12) has a front portion the shaping surface 74 of which is in the form of a shallow cup, and provision is made for the circulation of a cooling medium through an annular passage 75 therein by a tube 76 entering the side of the cup and a second tube 77 entering a plug 78 threaded into the back side of the cup. In addition the surface 74 of cup 64 has an annular row of apertures 80 in its face in communication with a passage 81 connected to a tube 82 the other end of which enters the body of a valve assembly 112 (Figs. 15 and 16). A vacuum line 83, also entering the body of this valve, is brought into communication with this tube during the period a charge is being seized, as will be brought out more fully hereinafter.

The arms 67 and 68 at their lower ends are fixed to supports 73 and 75 (Figs. 7 and 9) in turn secured to ends of cup arm sleeves 86 (Fig. 9) extending outside a gear housing 87 and carried by a shaft 88 passing through a section of the housing 87 and having its ends mounted in suitable bearings 89 (Figs. 7 and 9) secured in fixed relation to the housing. That end of each sleeve 86 which terminates within the housing carries a cam arm sleeve shifter block 91 held in place by adjusting and locking units 92 threaded to the sleeve. Each shifter block is provided with a roller 93 (Figs. 8a and 8b) which travels between guide bars 94 secured to the bottom of the housing, and with a second roller 95 riding in a groove 104 or 105 of an associated drum cam 96 fixed to shaft 33. Rotation of shaft 33 is effected by gear 34 which is in mesh with a pinion 35 driven by shaft 38 through the synchronizing differential assembly 45. Keyed to the shaft 88 (Fig. 9), immediately adjacent its bearings 89, are cup arm guide rod brackets 84 and 85 respectively, which hold a transverse guide rod 90 passing through suitable bearings provided in supports 73 and 75. This rod, while permitting lateral movement of the cup arms 67 and 68 by their operating sleeves, rigidly holds them in a fixed radial position with respect to the shaft 88. Rotation of the drum 96 thus produces lateral movement of the sleeves 86 in accordance with the outlines of the cam grooves 104 and 105. The movements of the cup arms is so synchronized with the shear blades 23 as to bring the cups 63 and 64 into seizing relation with a falling charge of glass an instant after it has been separated from the parent body. As heretofore pointed out, a vacuum line is in communication with cup tube 82 at this time and assists in the seizure of the charge. The cup arms 67 and 68 are also arranged to oscillate in such a manner that they transfer or carry the cups 63 and 64 from alignment with the forehearth outlet into alignment with the orifice of an orifice plate 100 upon which a seized charge of glass is to be deposited. This oscillatory movement is produced by a linkage 97 (Fig. 9a) under influence of a cam 103. This cam is similar in character to that which effects the tilting action of the shears. The linkage extends between a lower leg 101 of guide bracket 85 and the upper end of a cam lever 102 centrally pivoted at 102' and carrying a roller 110 which rides in a cam groove 111. The exact synchronization of movement of the shear and cup arm tilting assemblies is accomplished by rotation of the spider of the differential assembly 44 (Fig. 9). This spider is in the form of a worm wheel 106 held stationary by a worm 107 carried by a square ended shaft 109 which may be rotated to effect rotation of the cluster gear pinion 47 with respect to bevel pinion 108, thereby changing the position of the gear 32 and its shear tilting cam groove 31 (Fig. 8a) with respect to the cup arm tilting cam 103 whenever necessary or desirable. The differential assembly 45 is employed in similar manner to synchronize the movement of the blowing machine with the gob forming and transfer assembly so as to insure the cup 64 will be in exact register with the orifice of an orifice plate 100 when a parison is deposited thereon.

As previously mentioned, the cup supporting brackets 65 and 66 (Figs. 7b and 10) may be mounted in fixed or rotatable relation with respect to their supporting arms. In the present disclosure, bracket 65 is in fixed relation with respect to its arm while bracket 66 is made rotatable.

The cups 63 and 64, when over the support on which a parison of glass is to be deposited, an orifice plate 100 in the present example, are separated by the previously described mechanism, and it should be noted in this connection (Fig. 10) that the cam grooves 104 and 105 (Fig. 9) have such contour that the separating movement is for the most part through arm 68 which moves leftward at the same speed as that of an orifice plate 100 (Fig. 8) on which it deposits the parison. At this time the parison is retained in cup 64 by vacuum until a cup turnover mechanism has turned the cup through a 90° angle, after which time the vacuum is discontinued and a puff of high pressure air substituted therefor to positively insure discharge of the gob.

The mechanism which controls the application of vacuum and pressure to cup 64 over an orifice plate comprises the valve assembly 112 (Figs. 9, and 14–16 inclusive) which is actuated by a cam 113 (Figs. 16 and 17) mounted on the lower end of arm 73. This valve assembly is provided with poppet valves 115 and 119 having associated control springs 127 and 128. The spring 127 of the assembly is stronger than spring 128 thereof so that the stem of valve 115 engages the stem of valve 119 and unseats the latter valve. The spring 128 in turn moves a valve operating button 114 to its left extremity thereby permitting air from line 116 to pass through the body of valve 112, tube 82, passage 81 (Fig. 11) and thence through the cup 64 to atmosphere through passage 75 and apertures 80. Since these apertures are quite small, back pressure immediately builds up in the valve body, thereby further opening the poppet valve 119 to the positions shown in Fig. 15. On the other hand, when button 114 is depressed by cam 113 the air supply is shut off from line 116, the stem of valve 119 engages and moves that of valve 115 against tension spring 127, thereby bringing the vacuum line 83 in communication with line 82 so that vacuum is applied at apertures 80 of the cup. With the arm 73 in any position other than the one in which deposit of the charge is to be effected, cam 113 is in position to depress button 114. When, however, the arm 73 has been tilted over an orifice plate and 90° turnover of its cup 63 has been effected, cam 113 is carried far enough to the left, having reference to Fig. 9, to release button 114 which accordingly assumes the position shown in Fig. 15, thereby closing the passage in the valve body to vacuum line 83 from tube 82 and in lieu thereof permitting poppet valve 119 to open and connect the pressure line 116 thereto. After deposit of the parison on the orifice plate and the arms 67 and 68 are oscillated backward and then arm 68 moves to the right toward the subsequent charge of glass accumulating at the orifice outlet. As it moves backward portion 118 of cam 113 engages and depresses the button 114 into the position illustrated in Fig. 16, thereby again substituting the vacuum line for the pressure line. The approximate movement of the cam 113 with respect to the button 114 is indicated by arrows in Fig. 17.

The mechanism for turning over the cup 64 (Figs. 10 and 13) extends between a cup turnover crank 120 (Figs. 10–12) secured to the stub shaft 121 of the cup bracket 66 and a cup turnover mechanism bracket 122 (Fig. 13) mounted in fixed relation to the gear box 87. The intermediate apparatus includes a crank rod 123 one end of which is secured to a clevis 124 swiveled in the cup turnover crank 120, and the other end of which rod is similarly secured to one arm of a bell crank 125 pivotally secured to the arm 68 by a shoulder bolt 126. The other arm of the bell crank is elastically connected to the cup turnover mechanism supporting bracket 122. One end of the elastic connection comprises a push rod 130 having a cup turnover helical spring 131, a sleeve cap 132, and adjusting and locking nuts 133 threaded thereon with the end of the rod threaded into a clevis 134 swiveled to the previously mentioned other arm of the bell crank 125. The other end of the elastic connection comprises a connecting rod 130' similar in shape to rod 130 and having threaded thereon a sleeve cap 134 and a take-up spring 135, with the end of the rod threaded into a clevis swiveled to the mechanism supporting bracket 122. A cup turnover sleeve 136 with caps 132 and 134 threaded thereon encloses the head ends of rods 130 and 130' and spring 131. The construction is such, therefore, that any movement of arm 68 causes one or the other of the springs 131 and 135 to be compressed unless a turning of bell crank 125 compensates for such movement.

*Operation of cup turnover mechanism*

Since the forming cups are held together while a charge of glass is being moved over an orifice plate, rotation of the bracket 66 by its associated cup turnover crank at this time is positively prevented and therefore the bell crank 125, during this movement, remains stationary with respect to arm 68 and the compression of spring 135 of the cup tilting linkage is acordingly effected. As separation of the cups begins, however, power stored in this spring becomes effective to turn the cup through a 90° angle. With the cup in this position aligned directly over the orifice of an orifice plate and while being moved therewith, owing to the particular contour of cam groove 104, cam 113 becomes disengaged from button 114 and accordingly vacuum is disconnected from the cup and air pressure substituted therefor, thereby effecting deposit of the formed charge over the orifice of an orifice plate. In the course of the subsequent movement of the arm 68 away from the orifice plate, spring 131 is compressed until sufficient energy is stored therein to effect the rotation of cup 64 to its vertical position. By proper adjustment of nuts 133, this movement is made to occur before lateral movement of the arm 68 toward the forehearth orifice, preparatory to the receipt of a subsequent charge of glass, commences.

*Gob forming or feeder assembly (alternative form)*

Referring now to Figs. 22, 23, 24, and 25, the alternative form of feeder assembly will be described. This assembly includes a main support 151 adapted to be bolted to the bed of the glass working machine and carries power driven rolls 152 and 153 which receive successive falling charges of glass separated from a parent body by shears 23', rolls them into patties and deposits them over the orifices of the respective orifice plates 100 as such plates successively pass under the rolls 152 and 153. These rolls are carried by shafts 154 running in suitable bearings 155 (Fig. 25) enclosed in housings 160 and 163 (Figs. 24 and 25) supported by a bracket 157 slidably bolted to support 151 and provided with an adjusting screw 159 for enabling vertical adjustment of the height of the rolls to be readily made. In order to protect the mechanism against being damaged should large stones in the glass be fed to the rolls, the bearing housing 163 is mounted on a bed 161 which is slidable on the bracket 157 between angle irons 162 with a compression spring 164 engaging the bearing adjusted to normally hold roll 153 in proper position with respect to roll 152 while permitting lateral movement against spring 164.

The rolls 152 and 153 are driven by a counter-shaft 165 receiving power from the shaft 228 of the machine. This counter-shaft at its driving end carries a sprocket wheel 167 and spur gear 171 respectively, the roll 153 being directly driven by a chain 170, whereas roll 152 is driven by gear 171 through associated gears 172, 173 and 174. The driven end of shaft 165 carries a bevel gear 177 in mesh with a bevel pinion 179 on a vertical shaft 175. The lower end of this shaft and an upper coaxially related shaft 176 are keyed together through an adjustable link sleeve 178. The lower end of shaft 176 is in turn geared to a horizontal shaft 180 driven off shaft 228 by a chain drive 181.

While the rolls herein illustrated are of the plain type, a pocket roll of the type shown in the Woods et al. patent may be employed if desired, under which circumstances provision must be made for adjusting the radial position of the pockets with respect to the orifice plates. This is provided for by the sleeve 178 which is movable endwise by a lever 182 raised and lowered by a thumb screw 183 to change the rotary position of the pocket roll as required to insure deposit of the button portion of the formed gob in register with the orifice plate orifice under such circumstances. In order to suitably regulate the temperature of the rolls a fluid supply line 166 is connected with the bore of each shaft 154. Fluid supplied to this shaft passes through suitable ports 184 into the roll and then circulates through passageways 185 to an outlet tube 186.

Glass working machine

The machine frame is, for convenience of mobility, in the form of a wheeled carriage (Figs. 1-4 inclusive) having a flat bed 201. Vertical shafts 206 (Figs. 5, 6, and 6a) and 207 (Fig. 4b) and a central column 208 (Fig. 1) secured to the bed serve as supports for a casting 209 which bridges them and which has attached thereto a network of structural members 210 and 211 for supporting miscellaneous equipment, such as a puff box assembly 212 (Fig. 2), blow box assemblies 213 (Fig. 1), the various supporting tracks for a conveyer system, and cam tracks for performing various operations as will hereinafter be more fully described.

The puff and blow box assemblies 212 and 213 (Figs. 1 and 2) may be of the same general design as those illustrated and described in a co-pending Snyder application Sr. No. 117,951, filed December 28, 1936, and accordingly a detailed description of these units is believed unnecessary. Valved air supply lines 285 are provided so that any desired air pressures can be conveniently maintained in the respective boxes. A specific description of the particular manner of securing these boxes and of the various elements for supporting and controlling the conveyer system is believed unnecessary to a full understanding of the invention since such parts can obviously be held in place in any desired manner.

The shafts 206 and 207 in addition to serving as supports for casting 209 also serve as axial supports for rotatable columns 214 and 215 surrounding them. These columns in turn carry sprocket wheels 216 (Fig. 1) and 217 (Fig. 4) for driving the conveyer mechanism which includes the orifice plates hereinbefore referred to. The shaft 206 is held in an upright position by the introduction of its lower end into a flanged column sleeve 219 (Fig. 6a) secured to the carriage bed 201 and the upper surface of the flange 220 of which serves as a seat or bearing surface on which the flange 221 of column 214 rests. Shaft 207 is similarly secured to the bed 201. Rotary motion is transmitted to these columns by associated ring gears 223 driven by pinions 224. These pinions are keyed to the upper ends of jack shafts 225 themselves driven by gear 226 and pinion 227 connecting them to a shaft 228. This shaft is driven by a motor 230 (Fig. 6) through an intervening hydraulic transmission 231 and a connecting chain drive 232 (Fig. 3).

The upper end of the column 215 (Figs. 4b, 4c, 4d) at the loading end of the machine is turned down to a slightly reduced diameter and carries the chain driving sprocket 217 resiliently fixed thereto. This resilient linkage is provided to prevent undue strain on the chain driven by the sprocket, especially when starting the machine in operation. The linkage includes a sprocket hub 233 keyed to the column with the central shell 234 of the sprocket sliding over this hub. This hub carries a number of spring supports 235 between which and a similar number of spring supports 238, carried by webs 236 of the sprocket wheel, are secured compression springs 237 through which motion is transmitted to the sprocket. The relative motion between these parts is, however, positively limited by studs 239 passing through slots 240 (Fig. 4) and threaded into the top surface of hub 233.

The column 214, at the mold end of the machine (Figs. 5, 6 and 6a), is externally threaded along almost its entire length and has threaded thereon a hand wheel 242 which serves as an adjustable support for a mold supporting table 243 slidably keyed to the column. This height adjusting feature is provided to facilitate the use of different types of molds. Equally spaced around the column 214 on table 243 are eight mold assemblies.

Mold assemblies

Generally speaking, the mold assemblies (Figs. 1, 5, 20 and 21) are so designed that each mold proper comprises two halves, one of which remains in a vertical position, but has a sliding movement through an inclined path, while the other half rotates about a fixed axis. Specifically, each assembly comprises a support 245 (Figs. 20 and 21) having a pair of arms 246 provided with inclined fixed tracks 247 for rollers 248 carrying a platform 249 for the mold half 250 which has the sliding movement. The platform 249 is directly connected to the end of a drive rod 258 of a pneumatic power unit 259 which is arranged parallel to tracks 247 and it will therefore be evident that the platform is rolled up and down its tracks as air is supplied alternately to the lower and upper ends of the cylinder 260 of this unit. The arms 246 at their free ends are drilled to receive a transverse pin 251 which carries a platform 252 for the mold half 253 having a rotary movement. A sector gear 257 for transmitting rotary motion to platform 252 is also carried by pin 251. Rotary movement of platform 252 and its mold half 253 in synchronism with the movement of platform 249 is effected by a rack 262 in mesh with gear 257. This rack is carried by an arm 263, connected in fixed relation to platform 249, through an intervening support 264 and cushioning spring 265. With this form of construction it will be evident that as the rack moves back and forth the mold halves will be moved into and out of operative relation with one another. Proper cooling of the molds before they close is provided for by a fluid line 266 equipped with nozzles 267 directed towards the molds.

Control of mold operation

Control of the mold operation is accomplished by valve assemblies 268 (Figs. 5, 5a and 5b), individual to the respective molds. These assemblies are secured to the underside of the blow-head chain driving sprocket 216 through which air passages are provided to a manifold 270 ported to an air supply line 271 through a passage 272 provided in shaft 206. Each of the valve assemblies 268 is provided with a slide valve piston 275 having a drive rod 276 carrying a roller 278 engaging a cam track 279 the contour of which is such that it moves the piston 275 downward against the tension of a compression spring 283 when a mold reaches an indexed position at which it is desired to close the mold about a partially blown article which has just entered the path of movement of the molds. As will be observed (Figs. 5 and 5a) with piston 275 in its uppermost position compressed air is supplied to the lower end of a cylinder 260 of the power unit 259 (see Figs. 20 and 21), to effect closure of the mold, from supply line 271 via a passage 272 and a tube 280, at which time the upper end of the cylinder 260 is exhausted to atmosphere via a tube 281, the valve body and an open pet-cock 282. As the mold approaches the position at which the path of movement of an associated orifice plate is about to divert from that of the mold, the contour of the track 279 forces piston 275 to its alternative position (Fig. 5b). In this position compressed air from line 271 flows through passage 272, the valve body, and tube 281 to the upper end of cylinder 260 thereby driving its piston downward to open the mold. At this time the lower end of the cylinder 260 is exhausted to atmosphere, via passage 280, the body of valve 268 and an exhaust port 284.

The conveyer mechanism

The conveyer mechanism is composed of an endless chain comprising alternately arranged blow-head links 291 (Figs. 18 and 19) and blow-head drive links 292 respectively, which carry the previously referred to orifice plates 100, their blow-head assemblies, and associated operating mechanisms.

The opposite sides of each link are provided with vertically disposed link supporting rollers 293 adapted to ride in associated channel iron tracks 294 and 295 (Fig. 5) and with a horizontally disposed roller 296 adapted to ride in a channel or track 297 for maintaining the links in their proper lateral position.

The driving links 292 are comparatively simple units. Each such link is provided with a depending part 301 carrying a drive roller 302 entering the teeth 303 of the heretofore described drive sprockets 216 and 217 (Figs. 1, 3 and 4b) carried and driven by columns 214 and 215 respectively. Each drive link also carries a shoe 305 resting on compression springs 307. This shoe is adapted to be slightly depressed against the tension of its springs by the under surface of the nose 218 of the puff box 212 (Fig. 2) as the link passes thereunder and seals those apertures in the bottom of the puff and blow boxes not covered by the shoes 306 of the blow-head assemblies.

Each blow-head link 291 carries a flanged orifice plate carrier 308 surrounded with lateral thrust bearings 310 separated by a spacer 311 held in place by a lock washer and lock nut 312 threaded to the spindle. The lower or skirt portion 313 of orifice plate carrier 308 is provided with channels 314 for slidably supporting one of the orifice plates 100, the lateral movement of such plate with respect to its support being arranged to enable its placement into a position to receive a charge of glass, as will be fully brought out hereinafter. A blow-head lever bracket 315 crowns the top of the orifice plate spindle link 291 and surrounds the upper end of spindle 308 which is splined into a spindle driving gear 316. Rotary motion is transmitted to this gear by an associated drive gear 318 of an assembly secured to an extension 319 of the link 291. This assembly comprises a headed clutch shaft 321 upon which is threaded in the order specified a clutch spindle drive sleeve 322, a thrust washer 323, gear 318, a gear clutch spacer 324, a pinion 325, a washer 326, and a friction drive spring 327. These parts are held in place with spring 327 under moderate compression by a lock nut 328. With a further thrust washer threaded onto shaft 321 the same is threaded into the extension 319. The teeth of pinion 325 are permanently in mesh with teeth of an endless rack 330 (Fig. 3) running parallel to roller tracks 294, 295 (Fig. 5), and through the medium of friction washer 324 effects rotation of gear 318 and accordingly of the gear 316 and orifice plate carrier 308 so long as such carrier is free to rotate.

As will be brought out hereinafter, there are times during which rotation of the orifice plate carrier 308 is not desired and accordingly a suitable stop assembly is provided. This assembly is secured to the under side of extension 319 and includes a stop slide 331 carried by a stop slide fixture 332. A roller 333 on the outer end of slide 331 is held against a cam track 334 (Figs. 3, 4 and 5) by a helical spring 336 so that when the contour of the track permits it the inner end 341 of the slide enters the path of rotation of a stop 342 on the orifice plate carrier 308, thereby preventing rotation of the carrier. The cam track permits such movement of the slide 331 only at such times that the orifice of the associated orifice plate 100 is properly aligned under a blow-head tip 343 as will be more fully brought out hereinafter. This blow-head tip is threaded onto the lower end of a blow-head tip spindle 344 extending through a vertical bore in the orifice plate carrier 308. A key 345, secured to carrier 308 and extended into a keyway 346 in spindle 344, prevents relative rotary movement of these spindles while permitting relative endwise movement. The spindle 344 has a bore passing therethrough, the enlarged upper section of which contains a spindle take-up spring 348. The lower end of a blow-head shoe spindle 350 carries a seal 351, and a packing gland 349 is introduced in the upper end of this bore and is held therein with spring 348 sufficiently compressed to effect a good seal by internally flanged nut 352 surrounding spindle 350 and threaded to the upper end of the blow-head spindle 344. The upper part of the shoe spindle 350 has mounted thereon a collar 354 and the blow-head shoe 306 respectively. The collar is rigidly secured to the spindle by a set screw 355 and has an upper ball surface cooperative with a socket on the under side of the shoe. A nut 356 holds the shoe in place against an intervening seal ring 358. Possible rotary movement of the shoe with respect to the collar is prevented by the head end of a screw 357 threaded into the collar in register with a slot in the lower surface of the shoe.

Pivoted arms 368 extending from lever bracket 315 are pierced at their free ends to accommodate pins 371 carrying blow-head supporting and controlling rollers 372 and 373. The pins 371 after passing through their arms extend between the flanges of collar 354 so that vertical movement of the rollers also effects vertical movement of the blowhead assembly. Elevation of the blow-heads is effected by inclined tracks 375 and 376 (Fig. 3) encountered by the rollers 372 and 373 as the blow-head link travels from under the last encountered of the blowbox assemblies 213. After roller 373 passes off track 376, the blow-heads are supported by a horizontal run 377 of inclined track 375 until after the link passes the loading position where (Fig. 2) its end 378 is bent down to effect gradual lowering of a blow-head assembly as the roller 372 passes off the end thereof.

Movement of loaded orifice plate under its blow-head assembly

It has hereinbefore been pointed out that the parison forming cups deposit their parisons on the orifice plates as they successively arrive at a loading position. Before reaching this position, however, they are moved laterally with respect to their blow-heads. The method of and apparatus for so moving the orifice plates will be described later. An orifice plate, immediately after receiving a parison passes on into operative relation with an orifice plate pusher (Figs. 2 and 4) which slides the plate back under its blow-head assembly. This orifice plate pusher includes an arm 362 carrying a roller 363 at each end thereof and itself pivoted on a vertical shaft 364 (Fig. 2) which rotates the arm in a clockwise direction through a helical spring 365 which serves to cushion the action of the arm. The shaft 364 is driven by a worm wheel 366 on its lower end in mesh with a worm 367 carried by a shaft 368 (Fig. 2a) having a bevel pinion 369 on its other end in mesh with a bevel pinion 370 on the drive shaft 228 of the machine.

Immediately after the orifice plate is properly positioned under its blow-head assembly, the supporting roller 372 thereof passes off the track end 378 so that the blowhead tip 343 drops into operative relation with the parison and pinches the rim thereof against the orifice plate 100. The downward movement of the tip 343 to the extent required is positively assured by movement of rollers 372 and 373 on track surfaces provided by the under side of puff box nose 218. As the blow-head assembly advances a bit further leftward, the lower cam surface of the nose 218 permits the blowhead shoe to engage the bottom of the puff box so as to supply puffs of air through the blow-head to the parison as required to further develop it into a desired form. At the same time the spindle stop roller 333 (Fig. 19) encounters a raised surface 335 of its cam track 334 (Fig. 4) which forces it outward, thereby permitting rotation of the entire orifice plate assembly as the blank is developed during its movement toward the finishing molds. During this period of development of the blank it passes adjacent a conduit 340 (Fig. 2) which is suitably apertured to direct cooling air toward the blanks and thereby assist in the control of their proper formation prior to the closure of finishing molds about them.

As a parison arrives adjacent the blow mold turret a mold closes about the parison and the ware while still rotating within the mold is blown to its finished shape as the turret rotates approximately one-half revolution. The blow mold then opens as it arrives on the line of tangency of the opposite run of the heads and the orifice plate, with the blown article, travels over its rectilinear path from the mold turret. At the commencement of travel over such path (Fig. 3) roller 333 passes off the thickened portion 335 of track 334, thereby preventing further rotation of the orifice plate carrier 308. It is at this same time that the rollers 372 and 373 encounter inclined tracks 375 and 376 whereby the blow-head tip 343 is raised clear of the orifice plate. After a further travel of a blow-head link carrying a finished article suspended from its orifice plate, return of the orifice plate out of register with its blow-head is effected by a pusher assembly 380 (Figs. 3, 3a and 3b), similar to the one already described. Since the assembly 380 is so located on the machine that the orifice plates 100 when moved by it are loaded with finished articles more gentle movement of the plates is desirable than that obtained by the simple form of roller equipped double arm 362. Therefore, instead of such a structure the double ended arm 381 (Figs. 3a and 3b) is provided with levers 382 carrying rollers held against a cam track 383 by a spring 384 while a roller 387 is engaging and pushing an orifice plate out from under its spindle. The contour of the cam track 383 is such that the roller engages the orifice plate at its center during the entire movement, thereby insuring free and easy movement thereof. The vertical drive shaft 389 (Fig. 1) of this assembly is driven off of horizontal shafts 394 and 395 geared to shaft 364 (see Figs. 2a, 3 and 4).

Crack-off

The next step involves the separation of the finished article from the cullet remaining on the orifice plate. This separating operation is effected by a crack-off arm 385 (Figs. 1, 3 and 3c) oscillatable on a suspended vertical shaft 386. A spring 388 normally holds the arm 385 in the position shown in Fig. 3 against a stop screw 403 (Fig. 3) which limits its distance of counter-clockwise movement. As an orifice plate spindle passes the pivot point of the arm 385 its roller 390 engages a track 391 in fixed relation to arm 385, thereby moving it clockwise against the tension of spring 388 until the roller passes off the end of track 391, whereupon the arm 385 is returned to its initial position by the spring. On the return movement of arm 385 a button 392 on the free end thereof encounters and cracks off the finished article 393 suspended from the next orifice plate in advance of the assembly effecting the crack off operation. Any suitable form of conveyer may be associated with the machine to receive and carry off the finished articles.

Removal of cullet

An orifice plate from which the article has been separated in approaching the turret at the loading end of the machine passes under a scraper blade 401 (Figs. 4 and 4a) which scrapes the cullet 402 off the orifice plate into a suitable cullet chute (not shown). The scraper blade is pivoted at 404 and held in the position shown by a helical spring 405 which permits rotary movement of the scraper blade and therefore reduces chances of its breakage by cullet sticking rather tenaciously to a plate. Quick rebound of the scraper blade on the release of such cullet is, on the other hand, prevented by a pneumatic checking device 406.

We claim:

1. In a glass working apparatus, a continuously moving chain carrying a series of orifice plates each individually mounted on a vertical axis, means cooperative with such plates continuously tending to effect their rotation about their axes, and means for preventing rotation of the plates at selected stretches along their path of travel.

2. In a glass working apparatus a continuously traveling assembly including an orifice plate adapted to receive a parison of glass and to retain the same in the entire course of its fabrication into ware, means for depositing a parison on said plate, means for immediately thereafter moving said plate to an alternative position with respect to said assembly, means for then rotating said plate about an axis concentric with the orifice therein, means for fabricating the parison into a finished article, means for then stopping rotation of said plate and for moving it to its initial position, and means for thereafter removing the finished article from association with said plate.

3. In a glass working apparatus, a continuously moving chain carrying a series of orifice plates and cooperative blow-head assemblies respectively, means for effecting a movement of each orifice plate from an initial position with respect to its associated blowhead assembly immediately after passing a loading position in its path of travel to a position in which it can be acted upon by its blow-head assembly, and means for returning such orifice plate to its initial position prior to its subsequent arrival at the loading position.

4. In a glass working apparatus, a conveyer chain including links carrying apertured glass supporting plates and cooperative blow-head assemblies, means for continuously moving said chain over an endless path, a loading apparatus adjacent one point of the path, means for moving the plates of said assemblies from operative relation with their blow-head assemblies into position to receive a charge of glass from said loading apparatus, and means for effecting their return into operative relation with their blow-head assemblies after the loading apparatus has been passed.

5. In a glass working apparatus a continuously moving chain of orifice plates which successively pass loading, blowing, molding, and crack off positions; means for moving each orifice plate relative to the chain after passing the loading position, means for effecting rotation of each plate while passing through the molding positions, means for thereafter locking the plate in a definite angular position with respect to the chain, and means for restoring each plate to its initial position with respect to the chain before the crack off position is reached.

6. In a glass working machine, two turrets rotating about parallel axes, an endless chain of orificed supports for charges of glass incompassing said turrets, means for the successive radial projection of the supports with respect to the chain as they leave one of said turrets, means for loading each support with a charge of glass as it leaves the other of said turrets, means for returning each support to its initial position with respect to the chain, means for effecting the rotation of each support after its return to its initial position, and means for stopping such rotation before its radial projection occurs.

7. In a glass working machine, two turrets rotating about parallel axes, an endless chain of orificed supports for charges of glass incompassing said turrets, means for the radial projection of the supports as they leave one of said turrets, means for loading the supports with glass as they leave the other of said turrets, means for retracting the loaded supports, means for thereafter rotating the supports, and means for partly forming the glass into articles of ware as the loaded and retracted supports travel toward the other turret.

8. In a glass working machine, two turrets rotating about parallel axes, an endless chain of orificed supports for charges of glass incompassing said turrets, means for the radial projection of the supports as they leave one of said turrets, means for loading the supports with glass as they leave the other of said turrets, means for retracting the loaded supports, means for thereafter rotating the supports, means for partly forming the glass into an article of ware as the loaded and retracted supports travel toward the other turret, separable molds associated with such other turret in coaxial alignment with the orifices of the supports traveling about such turret, and means for closing said molds about partially formed articles suspended from the orifices of the supports to finish them while passing about such turret.

9. In a glass working machine, two turrets rotating about parallel axes, an endless chain of orificed supports for charges of glass incompassing said turrets, means for the radial projection of the supports as they leave one of said turrets, means for loading the supports with glass as they leave the other of said turrets, means for retracting the loaded supports, means for thereafter rotating the supports, means for partly forming the glass into an article of ware as the loaded and retracted supports travel toward the other turret, separable molds associated with such other turret in coaxial alignment with the orifices of the supports traveling about such turret, means for closing said molds about partially formed articles suspended from the orifices of the supports to finish them while passing about such turret, and means for separating the finished articles from the remaining cullet and the supports while the supports are traveling toward the turret at which loading occurs.

10. In a glass working apparatus, means for separating a charge of glass from a stream thereof, a pair of forming elements, means for actuating said elements to seize and shape such charge into a parison and to carry it over a parison receiving support, means for then separating said elements, vacuum means for assisting in the seizure of such charge and in its retention by one of said elements upon their separation, means for thereafter modifying the position of said one element with respect to said support, and means for substituting pneumatic means for said vacuum means to positively effect the discharge of the parison from such element.

11. The method which includes seizing and pressing a falling charge of plastic glass to a predetermined preliminary form between pressing surfaces rapidly moving toward one another, conveying the pressed charge to a position above a working surface, thereafter rotating the charge until a pressed surface thereof is in a plane substantially parallel to the working surface and then depositing the charge thereon.

12. The method which includes seizing and pressing a falling charge of plastic glass to a predetermined preliminary form between pressing surfaces rapidly moving toward one another, conveying the pressed charge to a position above a selected area of a moving working surface, thereafter moving the charge in synchronism with the working surface while rotating the charge until a pressed surface thereof is brought into a plane parallel to the working surface and then depositing the charge thereon.

13. The method which includes seizing and pressing a falling charge into a preliminary form between pressing surfaces moving toward one another, conveying the charge to a selected position with respect to a moving working surface, moving the charge along with such surface for a limited distance and depositing the charge thereon in the meantime.

14. A method which includes arresting the downward movement of a falling charge of glass by laterally moving shaping surfaces moving toward one another to shape the charge into a preliminary form, turning the shaped charge through a vertical arc, coordinating its movement with that of a moving support and depositing the charge thereon.

15. In a glass working apparatus an assembly including means for severing a gob of glass from a downwardly flowing stream thereof, a working surface laterally disposed with respect to said stream, a pair of gob forming elements, means for actuating said elements to seize and form a severed gob into a desired shape and for subsequently releasing the shaped gob therefrom, and means for moving said elements over said working surface prior to the release of the gob therefrom.

16. In a glass working apparatus an assembly including means for severing a gob of glass from a downwardly flowing stream thereof, a working support, means for fabricating an article from glass arranged over a selected area of said support, means for pressing a severed gob incidental to its seizure and for so placing it on said support that a selected area of the pressed portion of the gob is arranged over the selected area of said support.

17. A glass working apparatus including a forehearth having a bottom outlet, a glass working support arranged laterally with respect to but at a lower level than that of the bottom outlet, a device for severing a charge from the lower end of a stream of plastic glass flowing from the outlet, forming elements arranged below the forehearth on opposite sides of the outlet, means for moving said elements as required to seize and press the charge therebetween into a parison immediately following severance of the charge, and means for then moving said elements and the parison formed therebetween over said working support.

18. In a glass working apparatus, a continuously moving apertured support, a pair of normally separated elements positioned to seize a gob of glass severed from a stream thereof laterally disposed with respect to said support, means for closing said elements about a falling gob and for conveying it to a position over an orifice of said support and for then separating said elements, means for applying vacuum to one of said elements, means operated as said elements are being separated to rotate the vacuum supplied cup and the charge through a vertical arc of 90° in such direction as to bring the exposed surface of the gob over the support, and means for thereafter substituting the application of air pressure for vacuum whereby the charge is positively delivered to said support.

19. In a glass working apparatus, a horizontally disposed shaft, a pair of gob forming element arms arranged on said shaft, gob forming elements supported on the free ends of said arms, and means for sliding said arms on said shaft toward and away from one another to bring said elements into and out of cooperative relation with a charge of glass.

20. In a glass working apparatus, a horizontally disposed shaft, a pair of gob forming element arms arranged on said shaft, gob forming elements supported on the free ends of said arms, vacuum means for holding a gob of glass in one of said elements after their separation, means for rotating such one element through an arc of 90° in a direction to bring the open side of the element in a downwardly facing direction, and means for then substituting air under pressure for said vacuum means to eject the gob from the element.

21. In a glass working apparatus, a horizontally disposed shaft, a pair of gob forming element arms arranged on said shaft, gob forming elements supported on the free ends of said arms, and means for rotating said shaft to swing said arms and the elements carried thereby to an alternative position.

22. In a glass working apparatus, a plurality of continuously traveling supports each having an orifice therethrough, means for depositing a charge of plastic glass over the orifice of each support as it passes a loading position, means for thereafter rotating each support about its own axis as the glass thereon passes through the orifice and remains suspended from said support, traveling shaping means common to said supports, means for temporarily enclosing the suspended glass within said shaping means while rotation of the glass continues, and means for forcing the glass to final form while enclosed within said shaping means.

23. In a glass working apparatus a chain of orifice plates, a support for each orifice plate rotatable about the axial center of the orifice therein, means for continuously moving said chain about a closed path, means common to said supports tending to continuously rotate each support, rotation preventing means associated with each support, and means common to said supports for periodically rendering said last named means inoperative.

24. In a glass working apparatus a chain of orifice plates, a support for each orifice plate rotatable about the axial center of the orifice therein, means for continuously moving said chain about a closed path, means common to said supports tending to continuously rotate each support, means for moving each orifice plate laterally with respect to its support and for returning it to its initial position with respect thereto while its rotation preventing means is functioning, and means common to said supports for periodically rendering said rotation preventing means inoperative.

25. In a glass working apparatus, a continuously moving conveyor chain having a plurality of assemblies each including a support constituting a link of the chain, an orifice plate carrier rotatably mounted with respect to said support, and an orifice plate supported by said carrier and laterally movable with respect thereto.

26. In a glass working apparatus a continuously moving conveyor chain having a plurality of assemblies each including a support constituting a link of the chain, an orifice plate carrier rotatably mounted with respect to said support, an orifice plate supported by said carrier and laterally movable with respect thereto, mechanism continuously tending to rotate said carrier, and means for normally preventing rotation of the carrier.

27. In a glass working apparatus, a continuously moving conveyor chain having a plurality of assemblies each including a support constituting a link of the chain, an orifice plate carrier rotatably mounted with respect to said support, a friction clutch and a train of gears, a continuously rotating gear for transmitting rotary motion therefrom to said orifice plate carrier, and means normally preventing rotation of said train of gears.

28. In a glass working apparatus, a constantly traveling carrier of glass working assemblies each including an orifice plate unit and a blowhead unit, means for supplying the respective orifice plate units with charges of glass as such units successively arrive at a loading station, means for moving one of said units over a horizontal path into axial alignment with the other unit, means cooperative with each said unit for fabricating the charge of glass into a finished article, and means for thereafter restoring the horizontally moved unit to its initial position.

29. In a glass working apparatus a continuously moving carrier of assemblies each including an orifice plate unit and a blowhead unit which successively pass loading, blowing, molding and crack-off positions; means for moving one unit of each assembly relative to the other unit thereof after passing the loading position, means for effecting rotation of one unit of each assembly while passing through the molding positions, means for thereafter halting such unit against further rotation, and means for restoring the moved unit to its initial position with respect to its assembly before the crack-off position is reached.

30. In a glass working apparatus a continuously traveling assembly including an orifice plate unit adapted to receive a parison of glass and to retain the same in the entire course of its fabrication into ware and a blowhead unit for assisting in such fabrication, means for depositing a parison on said orifice plate unit, means for immediately thereafter laterally moving one of said units relative to the other to bring the units into cooperative relation, means for then rotating one of said units about an axis concentric to the orifice in the orifice plate unit, means cooperative with said assembly to fabricate the parison into a finished article, means for stopping rotation of said one unit, means for restoring the laterally moved unit to its initial position, and means for thereafter removing the finished article from association with said orifice plate unit.

31. In a glass working apparatus an assembly including an orifice plate and a blowhead, means for placing a charge of glass on the orifice plate, means for lowering the blowhead into cooperative relation with a charge deposited on said orifice plate, means including a finishing mold cooperative with said orifice plate and blowhead for fabricating the glass into a finished article, means for effecting relative rotary movement between the orifice plate and the finishing mold, and cam actuated mechanism for stopping such relative movement after the fabricating operation has been completed.

DAVID E. GRAY.
LEANDER N. POND.
WALTER C. WEBER.